United States Patent
Lee et al.

(10) Patent No.: US 11,073,950 B1
(45) Date of Patent: Jul. 27, 2021

(54) TOUCH SENSING DEVICE AND ELECTRONIC APPARATUS HAVING MALFUNCTION PREVENTION FUNCTION

(71) Applicant: Samsung Electro-Mechanics Co., Ltd., Suwon-si (KR)

(72) Inventors: Joo Hyoung Lee, Suwon-si (KR); Joo Yul Ko, Suwon-si (KR); Woo Young Choi, Suwon-si (KR); Soo Woong Lee, Suwon-si (KR); Jung Chul Gong, Suwon-si (KR); Je Hyuk Ryu, Suwon-si (KR); Byung Joo Hong, Suwon-si (KR); Tae Ho Lim, Suwon-si (KR); Gwang Pyo Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/081,102

(22) Filed: Oct. 27, 2020

(30) Foreign Application Priority Data

Aug. 31, 2020 (KR) ........................ 10-2020-0110344

(51) Int. Cl.
*G06F 3/044* (2006.01)
*G06F 3/043* (2006.01)
*G06F 3/041* (2006.01)

(52) U.S. Cl.
CPC ............ *G06F 3/044* (2013.01); *G06F 3/0414* (2013.01); *G06F 3/0436* (2013.01); *G06F 2203/04107* (2013.01)

(58) Field of Classification Search
None
See application file for complete search history.

(56) References Cited

FOREIGN PATENT DOCUMENTS

| KR | 10-2011-0030198 A | 3/2011 |
| KR | 10-2020-0020082 A | 2/2020 |

*Primary Examiner* — Aneeta Yodichkas
(74) *Attorney, Agent, or Firm* — NSIP Law

(57) ABSTRACT

A touch sensing device applied to an electronic device including a side portion having a cover that is nonconductive, and a frame that is conductive, includes: a first touch sensing portion including a first sensing electrode and a first sensing inductor disposed inside the cover and electrically connected to each other, wherein, in response to a touch applied through the cover by a human body, a capacitance is varied by the first touch sensing portion according to parasitic capacitance generated between the first sensing electrode and the human body according to the touch applied through the cover; and a reference sensing portion including a reference coil disposed inside the side portion and configured to provide reference inductance of the reference coil that is constant, regardless of a touch applied through the frame.

16 Claims, 14 Drawing Sheets

TOUCH SENSING DEVICE AND ELECTRONIC APPARATUS HAVING MALFUNCTION PREVENTION FUNCTION

CROSS-REFERENCE TO RELATED APPLICATIONS

This application claims the benefit under 35 USC § 119(a) of Korean Patent Application No. 10-2020-0110344 filed on Aug. 31, 2020 in the Korean Intellectual Property Office, the entire disclosure of which is incorporated herein by reference for all purposes.

BACKGROUND

1. Field

The following description relates to a touch sensing device and an electronic device having a malfunction prevention function.

2. Description of Related Art

In general, it is preferred that wearable devices have thinner, simpler, and neater designs. Thus, existing mechanical switches are being implemented less frequently. The elimination of mechanical switches is possible due to the implementation of dustproofing and waterproofing technologies, as well as the development of a model having a smooth, unified design.

Currently, a touch-on-metal (ToM) technology implementing touch inputs on metal, a capacitor sensing technology using a touch panel, a micro-electro-mechanical-system (MEMS), micro strain gauge technology, and the like, are being developed. Further, a force or touch function is also being developed.

In the case of a conventional mechanical switch, a large size and space are required internally to implement the switch function, and the conventional mechanical switch may have a structure that is not integral with an external case or a shape protruding outwardly, which causes a disadvantage of not being neat and occupying a substantial amount of space.

In addition, there is a risk of electric shocks due to direct contact with a mechanical switch that is electrically connected and, in particular, there is a disadvantage that it may be difficult to implement dustproofing and waterproofing due to the structure of the mechanical switch.

In addition, in a conventional switch device having a touch switch portion replacing a mechanical switch, a technique for preventing malfunctioning due to external factors is required.

For example, in the conventional switch device, there is a problem in that noise is introduced into internal portions or touch detection performance is deteriorated due to the influence of temperature.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a touch sensing device applied to an electronic device including a side portion having a cover that is nonconductive, and a frame that is conductive, includes: a first touch sensing portion including a first sensing electrode and a first sensing inductor disposed inside the cover and electrically connected to each other, wherein, in response to a touch applied through the cover by a human body, a capacitance is varied by the first touch sensing portion according to parasitic capacitance generated between the first sensing electrode and the human body according to the touch applied through the cover; and a reference sensing portion including a reference coil disposed inside the side portion and configured to provide reference inductance of the reference coil that is constant, regardless of a touch applied through the frame.

The reference sensing portion may further include a shielding member disposed between the reference coil and the side portion, and configured to block external influences.

The first sensing electrode may be disposed inside a first touch member, and the first touch member may be a part of the cover. The first sensing inductor may be electrically connected to the first sensing electrode and is mounted on a substrate. The first touch sensing portion may further include a first connection lead electrically connecting the first sensing electrode to one end of the first sensing inductor.

The touch sensing device may further include: a second touch sensing portion including a second sensing electrode and a second sensing inductor disposed inside the cover, and electrically connected to each other, wherein, in response to another touch applied through the cover by the human body, capacitance is varied by the second touch sensing portion according to parasitic capacitance generated between the second sensing electrode and the human body according to the other touch applied through the cover.

The second sensing electrode may be disposed inside a second touch member that is a part of the cover. The second sensing inductor may be electrically connected to the second sensing electrode and is mounted on a substrate. The second touch sensing portion may further include a second connection lead electrically connecting the second sensing electrode to one end of the second sensing inductor.

The reference coil, the first sensing inductor, and the second sensing inductor may have same characteristics.

The shielding member may be any one of a shield-can, a magnetic sheet, and an electromagnetic wave absorber.

The touch sensing device may further include a circuit portion configured to: generate a first touch detection signal and a second touch detection signal based on the capacitance varied by the first touch sensing portion and the capacitance varied by the second touch sensing portion; generate a reference signal based on reference inductance; and detect whether each of the touch and the other touch occurs, based on the reference signal, and the first touch detection signal, and the second touch detection signal.

In another general aspect, a touch sensing device applied to an electronic device including a side portion having a cover that is nonconductive and a frame that is conductive, includes: a first force sensing portion including a first sensing coil disposed to be spaced apart from an inner side surface of the frame by a first predetermined distance, wherein, in response to a pressing touch applied through the frame, inductance is varied by the first force sensing portion according to a change in distance between the first sensing coil and the frame according to the pressing touch applied through the frame; and a reference sensing portion including a reference coil disposed inside the side portion, and configured to provide reference inductance of the reference coil that is constant, regardless of the pressing touch applied through the frame.

The reference sensing portion may further include a shielding member disposed between the reference coil and the side portion, and configured to block external influences.

The first sensing coil may be spaced apart from a first force member that is part of the frame by a second predetermined distance, and the first sensing coil may be mounted on a substrate to face an inner side surface of the first force member. The first force sensing portion may further include: a first support member including a first body member supported by an internal structure of the frame, and supporting a portion of the substrate on which the first sensing coil is mounted; and a first column member supported by the first body member, and attached to ends of the first force member.

The touch sensing device may further include: a second force sensing portion including a second sensing coil disposed to be spaced apart from the inner side surface of the frame by a third predetermined distance, wherein, in response to a pressing touch applied through a second force member that is a part of the frame, inductance is varied according to a change in distance between the second sensing coil and the frame according to the pressing touch applied through the second force member.

The second sensing coil may be disposed to be spaced apart from an inner side surface of the second force member. The second force sensing portion may further include: a second support member including a second body member supported by the internal structure of the frame, and supporting a portion of the substrate on which the second sensing coil is mounted; and a second column member supported by the second body member, and attached to ends of the second force member.

The reference coil, the first sensing coil, and the second sensing coil may have same characteristics.

The shielding member may be any one of a shield-can, a magnetic sheet, and an electromagnetic wave absorber.

The touch sensing device may further include a circuit portion configured to: generate first and second force detection signals based on the inductance varied by the first force sensing portion and the inductance varied by the second force sensing portion; generate a reference signal based on the reference inductance; and detect whether each of the pressing touch and the other pressing touch occurs, based on the reference signal, the first force detection signal, and the second force detection signal.

In another general aspect, a touch sensing device applied in an electronic device including a side portion having a cover and a frame, a first touch member and a second touch member that are parts of the cover, and a touch switch portion including a first force member and a second force member that are parts of the frame, includes a first hybrid sensing portion including: a first sensing electrode and a first sensing inductor disposed inside the cover, and electrically connected to each other; and a first sensing coil disposed to be spaced apart from an inner side surface of the frame by a first predetermined distance, wherein, in response to a touch applied through the first touch member and the first force member by a human body, capacitance is varied by the first hybrid sensing portion according to parasitic capacitance generated between the first sensing electrode and the human body according to the touch applied through the first touch member and the first force member, and inductance is varied by the first hybrid sensing portion according to a change in distance between the first sensing coil and the frame. The touch sensing device includes a reference sensing portion including a reference coil disposed inside the side portion, and configured to provide reference inductance of the reference coil that is constant, regardless of a touch applied through the frame.

The reference sensing portion may further include a shielding member disposed between the reference coil and the side portion, and configured to block external influences.

The touch sensing device may further include a second hybrid sensing portion including: a second sensing electrode and a second sensing inductor disposed inside the cover, and electrically connected to each other; and a second sensing coil disposed to be spaced apart from an inner side surface of the frame by a second predetermined distance, wherein, in response to a touch applied through the second touch member and the second force member by the human body, capacitance is varied by the second hybrid sensing portion according to parasitic capacitance generated between the second sensing electrode and the human body according to the touch applied through the second touch member and the second force member, and inductance is varied according to a change in distance between the second sensing coil and the frame.

The first sensing electrode may be disposed inside the first touch member. The first sensing inductor may be electrically connected to the first sensing electrode, spaced apart from an inner side surface of the first force member by a third predetermined distance, and mounted on a substrate to face the inner side surface of the first force member. The first hybrid sensing portion may further include: a first connection lead electrically connecting the first sensing electrode to one end of the first sensing inductor; and a first support member including a first body member supported by an internal structure of the frame, and supporting a portion of the substrate on which the first sensing inductor is mounted, and a first column member supported by the first body member and attached to ends of the first force member.

The second sensing electrode may be disposed inside the second touch member. The second sensing inductor may be electrically connected to the second sensing electrode, spaced apart from an inner side surface of the second force member by a fourth predetermined distance, and mounted on a substrate to face the inner side surface of the second force member. The second hybrid sensing portion may further include: a second connection lead electrically connecting the second sensing electrode to one end of the second sensing inductor; and a second support member including a second body member supported by an internal structure of the frame, and supporting a portion of the substrate on which the second sensing inductor is mounted, and a second column member supported by the second body member and attached to ends of the second force member.

The reference coil, the first sensing inductor, and the second sensing inductor may have same characteristics.

The shielding member may be any one of a shield-can, a magnetic sheet, and an electromagnetic wave absorber.

The touch sensing device may further include a circuit portion configured to: generate first and second touch detection signals based on the capacitance and the inductance varied by the first hybrid sensing portion, and the capacitance and the inductance varied by the second hybrid sensing portion; generate a reference signal based on the reference inductance; and detect whether each of the touch applied through the first touch member and the first force member and the touch applied through the second touch member and the second force member occurs, based on the reference signal, the first touch detection signal, and the second touch detection signal.

In another general aspect, an electronic device includes: a side portion having a cover that is nonconductive and a frame that is conductive; a touch switch portion including a first touch member that is a part of the cover; a first touch sensing portion including a first sensing electrode and a first sensing inductor disposed inside the cover and electrically connected to each other, wherein, in response to a touch applied through the first touch member by a human body, capacitance is varied by the first touch sensing portion according to parasitic capacitance generated between the first sensing electrode and the human body according to the touch applied through the first touch member; and a reference sensing portion including a reference coil disposed inside the side portion and configured to provide reference inductance of the reference coil that is constant, regardless of a touch applied through the frame.

The reference sensing portion may further include a shielding member disposed between the reference coil and the side portion, and configured to block external influences.

The first sensing electrode may be disposed inside the first touch member. The first sensing inductor may be electrically connected to the first sensing electrode, and mounted on a substrate. The first sensing portion may further include a first connection lead electrically connecting the first sensing electrode to one end of the first sensing inductor.

The electronic device may further include: a second touch sensing portion including a second sensing electrode and a second sensing inductor disposed inside the cover and electrically connected to each other, wherein, in response to a touch applied through the cover by the human body, capacitance is varied by the second touch sensing portion according to parasitic capacitance generated between the second sensing electrode and the human body according to the touch applied through the cover.

The second sensing electrode may be disposed inside a second touch member that is a part of the cover. The second sensing inductor may be electrically connected to the second sensing electrode and mounted on a substrate. The second touch sensing portion may further include a second connection lead electrically connecting the second sensing electrode to one end of the second sensing inductor.

The reference coil, the first sensing inductor, and the second sensing inductor may have same characteristics.

The shielding member may be any one of a shield-can, a magnetic sheet, and an electromagnetic wave absorber.

The electronic device may further include a circuit portion configured to: generate first and second touch detection signals based on the capacitance varied by the first touch sensing portion and the capacitance varied by the second touch sensing portion; generate a reference signal based on the reference inductance; and detect whether each of the touch applied through the first touch member and the touch applied through the cover occurs, based on the reference signal, the first sensing signal, and the second sensing signal.

In another general aspect, an electronic device includes: a side portion having a cover that is nonconductive and a frame that is conductive; a touch switch portion including a first force member that is a part of the frame; a first force sensing portion including a first sensing coil disposed to be spaced apart from an inner side surface of the frame by a first predetermined distance, wherein, in response to a touch applied through the first force member, inductance is varied by the first force sensing portion according to a change in distance between the first sensing coil and the frame according to the touch applied through the first force member; and a reference sensing portion including a reference coil disposed inside the side portion and configured to provide reference inductance of the reference coil that is constant, regardless of a touch applied through the frame.

The reference sensing portion may further include a shielding member disposed between the reference coil and the side portion, and configured to block external influences.

The first sensing coil may be spaced apart from the first force member by a second predetermined distance, and may be mounted on a substrate to face an inner side surface of the first force member. The first sensing portion may further include: a first support member including a first body member supported by an internal structure of the frame and supporting a portion of the substrate on which the first sensing coil is mounted; and a first column member supported by the first body member and attached to ends of the first force member.

The electronic device may further include: a second force sensing portion including a second sensing coil disposed to be spaced apart from the inner side surface of the frame by a third predetermined distance, wherein, in response to a touch applied through a second force member that is a part of the frame, inductance is varied by the second force sensing portion according to a change in distance between the second sensing coil and the frame according to the touch applied through the second force member.

The second sensing coil may be disposed to be spaced apart from an inner side surface of the second force member by a fourth predetermined distance. The second force sensing portion may further include: a second support member including a second body member supported by the internal structure of the frame and supporting a portion of the substrate on which the second sensing coil is mounted; and a second column member supported by the second body member and attached to ends of the second force member of the frame.

The reference coil, the first sensing coil, and the second sensing coil may have same characteristics.

The shielding member may be any one of a shield-can, a magnetic sheet, and an electromagnetic wave absorber.

The electronic device may further include a circuit portion configured to: generate first and second force detection signals based on the inductance varied by the first force sensing portion and the inductance varied by the second force sensing portion; generate a reference signal based on the reference inductance; and detect whether each of the touch applied through the first force member and the touch applied through the second force member occurs, based on the reference signal, the first force detection signal, and the second force detection signal.

In another general aspect, an electronic device includes: a side portion having a cover that is nonconductive and a frame that is conductive; a touch switch portion including a first touch member that is a part of the cover, and a first force member that is a part of the frame; a first hybrid sensing portion; and a reference sensing portion. The first hybrid sensing portion includes: a first sensing electrode and a first sensing inductor disposed inside the cover and electrically connected to each other; and a first sensing coil disposed to be spaced apart from an inner side surface of the frame by a first predetermined distance, wherein, in response to a touch applied through the first touch member and the first force member by a human body, capacitance is varied by the first hybrid sensing portion according to parasitic capacitance generated between the first sensing electrode and the human body according to the touch applied through the first touch member and the first force member, and inductance is varied by the first hybrid sensing portion according to a change in distance between the first sensing coil and the frame. The reference sensing portion includes a reference coil disposed inside the side portion and configured to provide reference inductance of the reference coil that is constant, regardless of a touch applied through the frame.

The reference sensing portion may further include a shielding member disposed between the reference coil and the side portion, and configured to block external influences.

The electronic device may further include a second hybrid sensing portion including: a second sensing electrode and a second sensing inductor disposed inside the cover and electrically connected to each other; and a second sensing coil disposed to be spaced apart from an inner side surface of the frame by a second predetermined distance, wherein, in response to a touch applied through a second touch member and a second force member, which are parts of the side portion and included in the touch switch portion, by the human body, the capacitance is varied by the second hybrid sensing portion according to parasitic capacitance generated between the second sensing electrode and the human body according to the touch applied through the second touch member and the second force member, and the inductance is varied by the second hybrid sensing portion according to the change in the distance between the second sensing coil and the frame.

The first sensing electrode may be disposed inside the first touch member. The first sensing inductor may be electrically connected to the first sensing electrode, spaced apart from an inner side surface of the first force member by a third predetermined distance, and mounted on a substrate to face the inner side surface of the first force member. The first hybrid sensing portion may further include: a first connection lead electrically connecting the first sensing electrode to one end of the first sensing inductor; and a first support member including a first body member supported by an internal structure of the frame, and a first column member supported by the first body member and attached to ends of the first force member.

The second sensing electrode may be disposed inside the second touch member, the second touch member being a part of the cover. The second sensing inductor may be electrically connected to the second sensing electrode, spaced apart from an inner side surface of the second force member, which is a part of the frame, by a fourth predetermined distance, and mounted on a substrate to face the inner side surface of the second force member. The second hybrid sensing portion may further include: a second connection lead electrically connecting the second sensing electrode to one end of the second sensing inductor; and a second support member including a second body member supported by an internal structure of the frame, and a second column member supported by the second body member and attached to ends of the second force member.

The reference coil, the first sensing inductor, and the second sensing inductor may have same characteristics.

The shielding member may be any one of a shield-can, a magnetic sheet, and an electromagnetic wave absorber.

The electronic device may further include a circuit portion configured to: generate first and second touch detection signals based on the capacitance and the inductance varied by the first hybrid sensing portion, and the capacitance and the inductance varied by the second hybrid sensing portion; generate a reference signal based on the reference inductance; and detect whether each of the touch applied through the first touch member and the first force member and the touch applied through the second touch member and the second force member occurs, based on the reference signal, the first touch detection signal, and the second touch detection signal.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
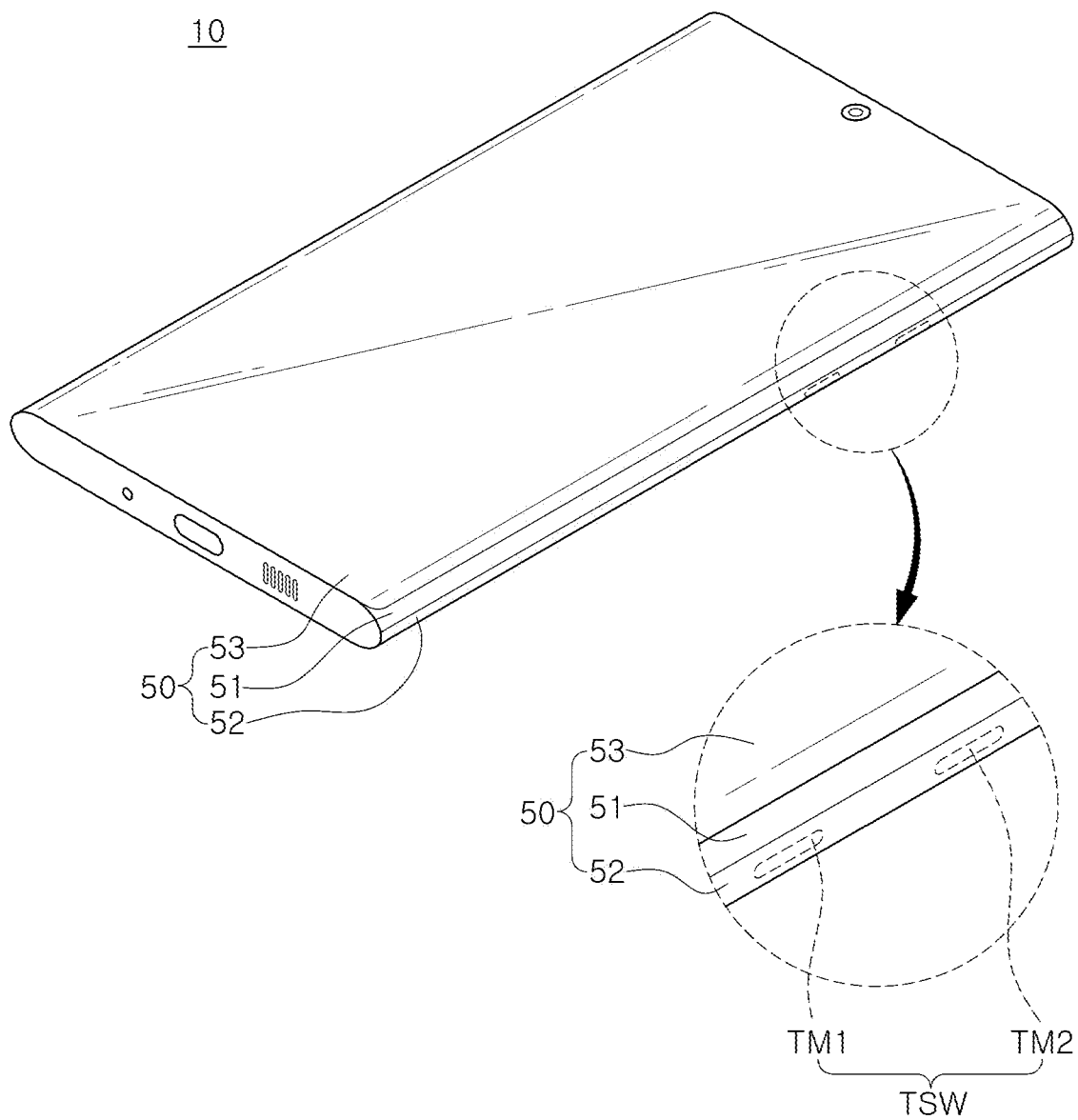
FIG. 1 is a diagram illustrating an external appearance of an electronic device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

FIG. 1 is a view illustrating an exterior of an electronic device 10, according to an embodiment.

Referring to FIG. 1, the electronic device 10 may include, for example, a side portion 50 and a touch switch portion TSW.

The side portion 50 may include a frame 51, a cover 52, and a glass 53. For example, the side portion 50 may have a triple-layer structure including the glass 53, the frame 51, and a cover 52.

The frame 51 may be a metal frame forming a central framework of the electronic device 10.

The glass 53 may be a front display panel disposed on a front surface, which is located on one side of the frame 51.

The cover 52 may be nonconductive, and may be disposed on a rear surface, which is located on the other side of the frame 51. For example, a material of the cover 52 may be glass or plastic, but is not limited to glass or plastic.

Figure 2:
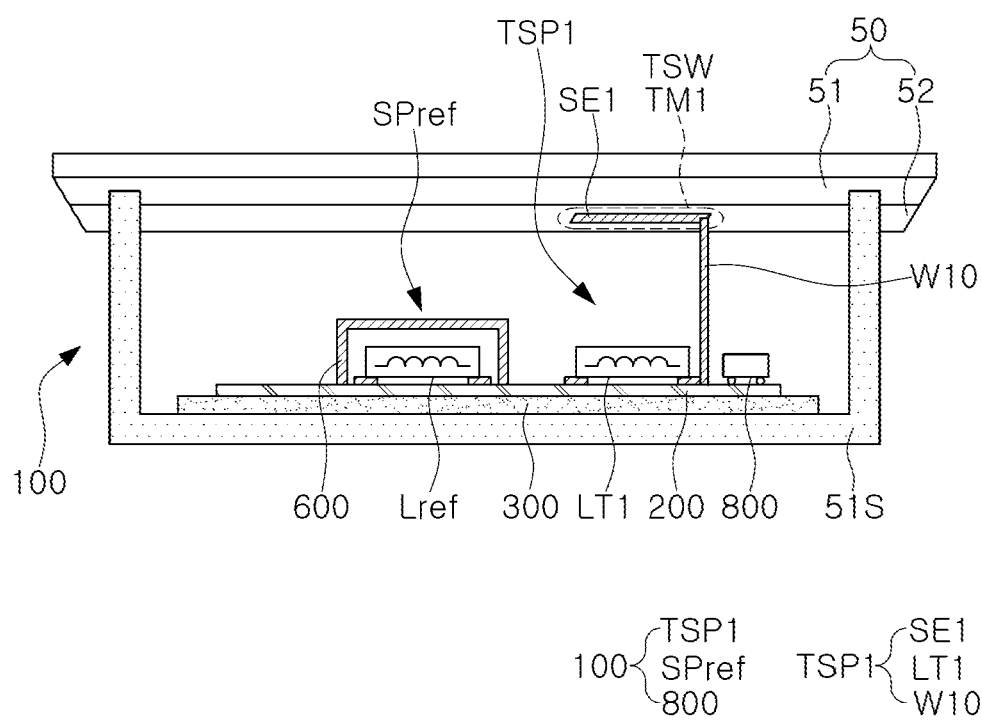
FIG. 2 is a diagram illustrating an internal structure of the electronic device of FIG. 1, according to an embodiment.

For example, referring to FIGS. 1 and 2, in an example structure of the electronic device 10 embodied as a modern mobile phone, the frame 51 may be disposed at the center of the structure, the glass 53 may be disposed on a front surface, which is at an upper portion of the electronic device 10, and the cover 52 may be disposed on a rear surface, which is at a rear portion of the electronic device 10.

As another example, the side portion 50 of the electronic device 10 may have a dual layer structure including the frame 51 and the cover 52. In this case, the frame 51 may be disposed at the center of the electronic device 10, and the cover 52 may be disposed on a rear surface, which is at a lower portion of the electronic device 10.

The touch switch portion TSW may include a first touch member TM1 and a second touch member TM2 formed on the side portion 50 of the electronic device 10, to replace a mechanical button, for example.

Figure 6:
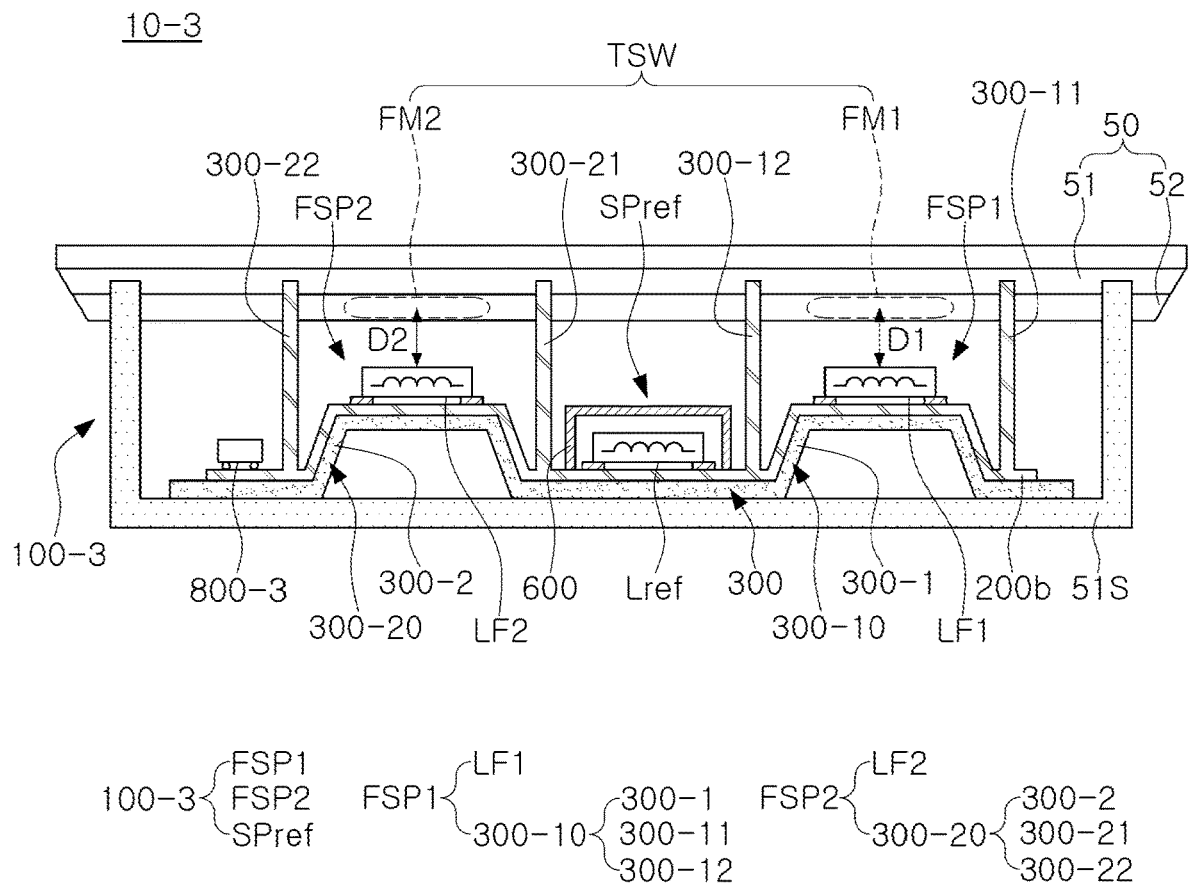
FIG. 6 is a diagram illustrating an internal structure of an electronic device, according to an embodiment.

As another example, the touch switch portion TSW may include first and second force members FM1 and FM2 of FIG. 6 formed on the side portion 50.

As an example, the first touch member TM1 and the second touch member TM2 may be a part of the cover 52, and the first and second force members FM1 and FM2 of FIG. 6 may also a part of the frame 51.

For example, referring to FIG. 1, the electronic device 10 may be a portable device, such as a smartphone, or the like, or a wearable device, such as a smartwatch, and is not limited to a specific device. The electronic device 10 may be a portable or wearable electronic device, or an electronic device having a switch for operation control.

In this disclosure, a touch may include a touch corresponding to a contact and a touch corresponding to pressing. According to the disclosure herein, the contact is a simple contact without pressing force, and pressing means pressing force (or force) following the contact. Accordingly, in this document, a touch that does not specify a contact or pressing may include both a contact and force (pressing), or may be any one of a contact and force (pressing).

In FIG. 1, for example, the touch members and the force members, such as the first touch member TM1, the second touch member TM2, and the first and second force members (TM1 and TM2 in FIG. 6) may not be externally exposed, and, for example, may have a structure that cannot be seen from the outside with the naked eye, as a result of various passivation treatments.

In FIG. 1, two touch members (the first and second touch members TM1 and TM2) are included, but this configuration is merely an example and the touch switch portion TSW is not limited to the two members. For example, a touch sensing device, according to an embodiment, may include one or more touch members and one or more force members.

In addition, since a touch sensing device according to this disclosure has a structure in which sensing electrodes (e.g., SE1 and SE2 in FIG. 3) are disposed inside the cover 52, which is made of a nonconductive material such as glass, unlike the case in which a plurality of touch sensors are disposed inside an existing metal case, a disadvantage in which it is difficult to identify a plurality of touch switches in a metal case may be avoided.

In addition, a touch sensing device disclosed herein may prevent a malfunction due to an external factor by canceling noise caused by the external factor by using a reference sensing portion (SPref in FIG. 2), to be described in more detail later.

FIG. 2 is a diagram of an internal structure of the electronic device 10, according to an embodiment.

Referring to FIG. 2, the electronic device 10 may include a touch sensing device 100 disposed therein.

The side portion 50 may include, for example, a cover that is nonconductive, and the frame 51 that is conductive. In addition, the frame 51 may include an internal structure 51S.

The touch switch portion TSW may include the first touch member TM1, which is a part of the cover 52. The first touch member TM1 may be an active region that can be effectively detected for application of a touch.

The touch sensing device 100 may include a first touch sensing portion TSP1 and a reference sensing portion SPref.

For example, the first touch sensing portion TSP1 may include a first sensing electrode SE1 and a first sensing inductor LT1 disposed inside the cover 52 and electrically connected to each other. The first touch sensing portion TSP1 may further include a first connection lead W10 electrically connecting the first sensing electrode SE1 to one end of the first sensing inductor LT1. The first sensing electrode SE1 may be disposed inside the first touch member TM1. The first sensing inductor LT1 may be mounted on a substrate 200.

When a touch (e.g., contact) of a human body is applied through the cover 52, capacitance varied according to parasitic capacitance generated between the first sensing electrode SE1 and the human body according to the touch may be provided.

The reference sensing portion SPref may include a reference coil Lref disposed inside the side portion 50, and may provide reference inductance of the reference coil Lref that is constant regardless of the application of a touch through the frame 51. The reference sensing portion SPref may include a shielding member 600. The shielding member 600 may be disposed between the reference coil Lref and the side portion 50 to block external influences. For example, the shielding member 600 may be mounted on the substrate 200 to cover the reference coil Lref.

In addition, as shown in in FIG. 2, the touch sensing device 100 may further include a support member 300 and a circuit portion 800, to be described in more detail later.

For each drawing of this disclosure, unnecessary and redundant descriptions of components having the same reference numerals and functions may be omitted, and possible differences may be described.

Figure 3:
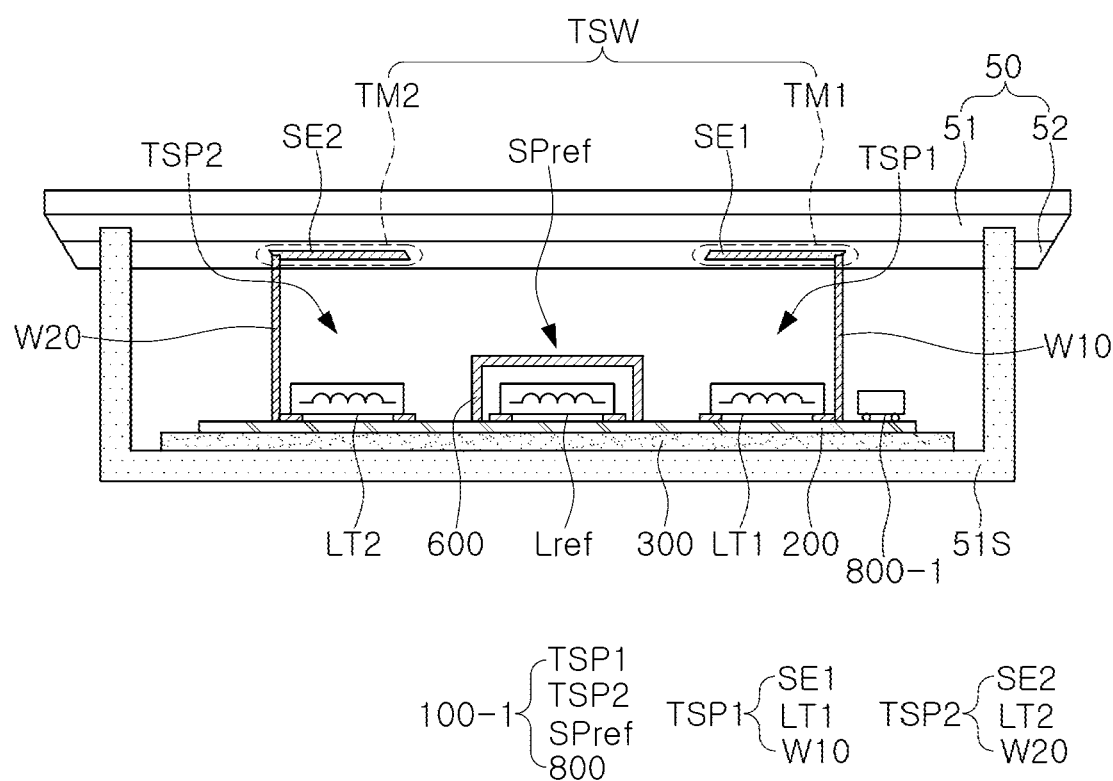
FIG. 3 is diagram illustrating an internal structure of an electronic device, according to an embodiment.

FIG. 3 is a diagram of an internal structure of an electronic device 10-1, according to an embodiment of the present disclosure.

Referring to FIG. 3, a touch sensing device 100-1 that can be applied to the electronic device 10-1 may include the first touch sensing portion TSP1, the reference sensing portion SPref, and a second touch sensing portion TSP2. The first touch sensing portion TSP1 and the reference sensing portion SPref are described above with reference to FIG. 2.

For example, the second touch sensing portion TSP2 may include a second sensing electrode SE2 and a second sensing inductor LT2 disposed inside the cover 52 and electrically connected to each other. The second touch sensing portion TSP2 may further include a second connection lead W20 electrically connecting the second sensing electrode SE2 to one end of the second sensing inductor LT2. The second sensing electrode SE2 may be disposed inside the second touch member TM2. The second sensing inductor LT2 may be mounted on the substrate 200.

When a touch (e.g., contact) of a human body is applied through the cover 52, capacitance varied according to parasitic capacitance generated between the second sensing electrode SE2 and the human body according to the touch may be provided.

As an example, referring to FIGS. 2 and 3, the reference coil Lref may be manufactured to have the same characteristics as the first sensing inductor LT1 and the second sensing inductor LT2.

Accordingly, due to external factors, each of the reference coil Lref, the first sensing inductor LT1, and the second sensing inductor LT2 may include noise having the same characteristic, and such noise may be cancelled through a simple subtraction operation, or the like, in the circuit portion.

For example, the reference coil Lref, the first sensing inductor LT1, and the second sensing inductor LT2 may be a device, a component or a PCB chip having inductance. However, a structure of the reference coil Lref, the first sensing inductor LT1, and the second sensing inductor LT2 not particularly limited, and any structure is sufficient as long as it has inductance. For example, the reference coil Lref, the first sensing inductor LT1, and the second sensing inductor LT2 may be a coil component or a PCB coil chip.

In addition, in FIG. 3, the touch sensing device 100-1 may further include the support member 300, and a circuit portion 800-1, to be described in more detail later.

In this disclosure, the first and second connection leads W10 and W20 may be conductor wires or conductor lines having a flexible PCB, and are not limited to the form shown in the drawing. The first and second connection leads W10 and W20 may be conductor lines that can be electrically connected.

In addition, since the first and second sensing electrodes SE1 and SE2 and the sensing inductors LT1 and LT2 are respectively connected to each other through connection wires such as the first and second connection leads W10 and W20, positions to place the first and second sensing inductors LT1 and LT2 are not particularly limited, and the disposition positions of the first and second sensing inductors LT1 and LT2 may be freely determined.

In this disclosure, the shielding member 600 may be any one of a shield-can, a magnetic sheet, and an electromagnetic wave absorber, which will be described in more detail with reference to FIGS. 13 to 15B.

Figure 4:
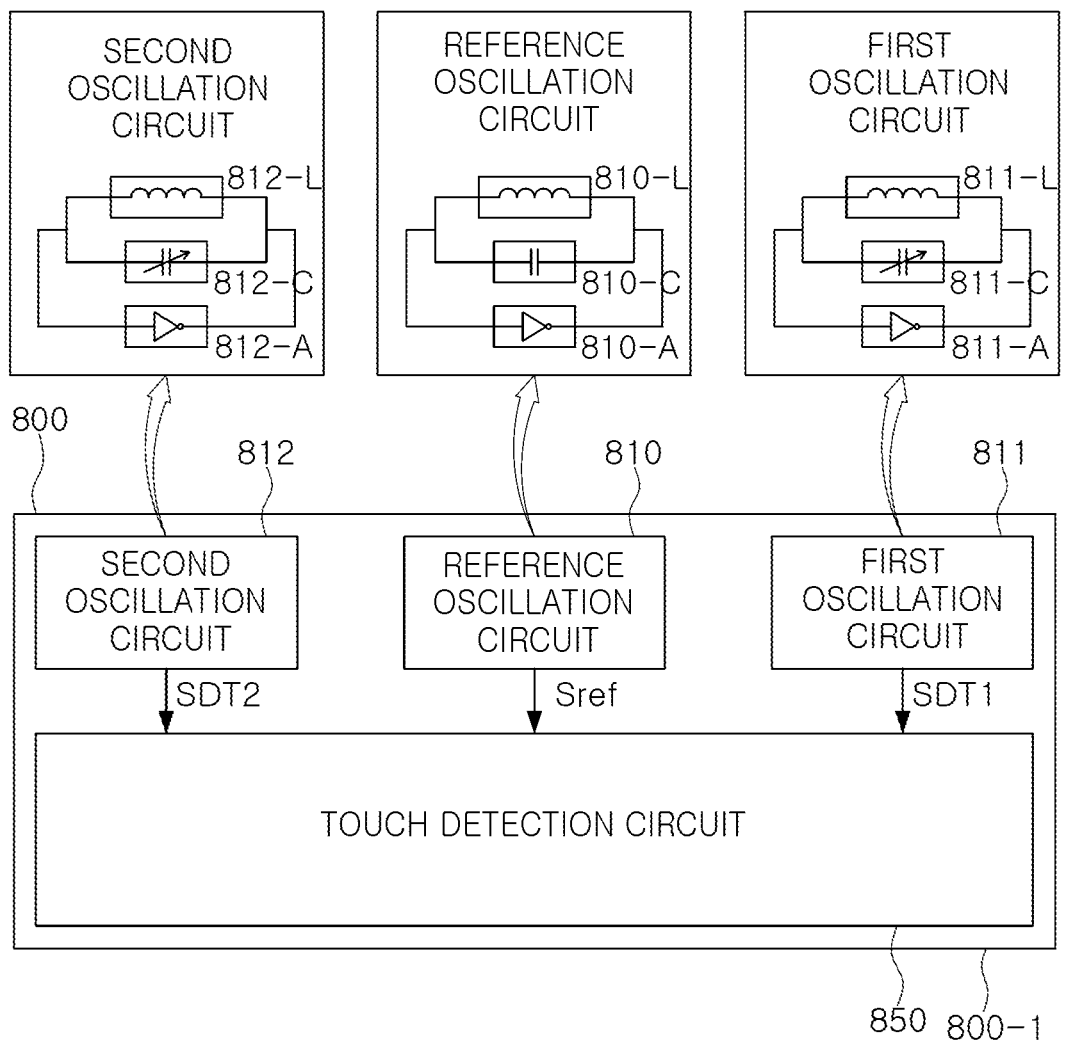
FIG. 4 is a diagram of a circuit portion of FIG. 3, according to an embodiment.

FIG. 4 is a diagram of the circuit portion 800-1 of FIG. 3.

Referring to FIGS. 3 and 4, the circuit portion 800 may be mounted on the substrate 200.

The circuit portion 800-1 may generate first and second touch detection signals SDT1 and SDT2 based on capacitance varied by the first and second touch sensing portions TSP1 and TSP2, respectively, generate a reference signal Sref based on reference inductance by the reference sensing portion SPref, and detect whether a touch has occurred based on the reference signal Sref, and the first and second touch detection signals SDT1 and SDT2.

For example, the circuit portion 800-1 may include a first oscillation circuit 811, a reference oscillation circuit 810, a second oscillation circuit 812, and a touch detection circuit 850.

The first oscillation circuit 811 may include a first capacitance portion 811-C, a first inductance portion 811-L, and a first amplification portion 811-A. The first capacitance portion 811-C may include capacitance caused by a first capacitor (which may be disposed inside or outside of the circuit portion 800-1) and parasitic capacitance generated by a touch. The first inductance portion 811-L may include inductance by the first sensing inductor LT1. The first amplification portion 811-A may amplify and maintain a signal having a resonance frequency by the first capacitance portion 811-C and the first inductance portion 811-L, and may output the first touch detection signal SDT1, which is an oscillation signal having the resonance frequency.

The second oscillation circuit 812 may include a second capacitance portion 812-C, a second inductance portion 812-L, and a second amplification portion 812-A. The second capacitance portion 812-C may include capacitance caused by a second capacitor (which may be disposed inside or outside of the circuit portion 800-1) and parasitic capacitance generated by a touch. The second inductance portion 812-L may include inductance by the second sensing inductor LT2. The second amplification portion 812-A may amplify and maintain a signal having a resonance frequency by the second capacitance portion 812-C and the second inductance portion 812-L, and may output the second touch detection signal SDT2, which is an oscillation signal having the resonance frequency.

The reference oscillation circuit 810 may include a reference capacitance portion 810-C, a reference inductance portion 810-L, and a reference amplification portion 810-A. The reference capacitance portion 810-C may include capacitance due to a reference capacitor (which may be disposed inside or outside of the circuit portion 800-1). The reference inductance portion 810-L may include inductance by a reference coil Lref. The reference amplification portion 810-A may amplify and maintain a signal having a reference resonance frequency by the reference capacitance portion 810-C and the reference inductance portion 810-L, so that the reference signal Sref, which is an oscillation signal having the reference resonance frequency, can be output. The touch detection circuit 850 may cancel noise by using the reference signal Sref, the first touch detection signal SDT1, and the second touch detection signal SDT2, and may detect whether a touch (e.g., a contact) has occurred through more accurate respective touch members.

For example, when the frequency of each of the first oscillation circuit 811 and the second oscillation circuit 812 changes due to external power, temperature, or external noise, the frequency of the reference oscillation circuit 810 having the same characteristics as the gain also changes. Therefore, if the frequency characteristics that change in the same manner are used as described above, the noise component can be canceled through a simple operation, to be described in more detail later.

Figure 5:
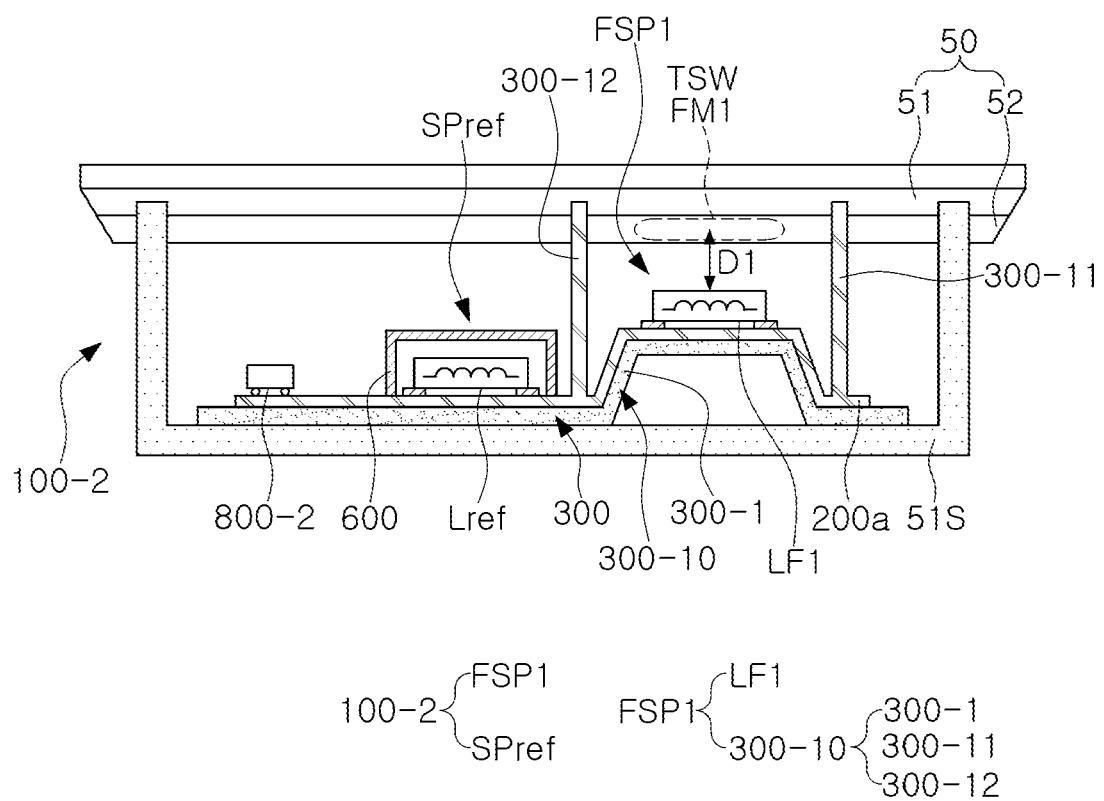
FIG. 5 is a diagram illustrating an internal structure of an electronic device, according to an embodiment.

FIG. 5 is a diagram of an internal structure of an electronic device 10-2, according to an embodiment.

Referring to FIG. 5, the electronic device 10-2 may include, for example, the side portion 50, the touch switch portion TSW, and a touch sensing device 100-2. The side portion 50 may include the cover 52, which is nonconductive, and the frame 51, which is conductive. The touch switch portion TSW may include the first force member FM1, which is a part of the frame 51. The touch sensing device 100-2 may include a first force sensing portion FSP1, the reference sensing portion SPref, and a circuit portion 800-2.

The first force sensing portion FSP1 may include a first sensing coil LF1 disposed spaced apart from an inner side surface of the frame 51 by a predetermined distance (e.g., D1). When a touch (e.g., pressing) is applied through the frame 51, inductance varied according to a change in a distance between the first sensing coil LF1 and the frame 51 according to the touch may be provided.

Due to an action of an eddy current generated by a change in the distance between the first sensing coil LF1 and the frame 51, the inductance of the first sensing coil LF1 changes (e.g., decreases). A resonance frequency based on the inductance may be increased, and an operation description may be applied to another corresponding embodiment of this disclosure. The reference sensing portion SPref may include the reference coil Lref disposed inside the side portion 50, and may provide standard inductance of the reference coil Lref, which is constant irrespective of the application of a touch through the frame 51. The reference sensing portion SPref may include the shielding member 600 capable of excluding an electromagnetic influence due to the touch application, even when a touch is applied through the side portion 50. The shielding member 600 may be disposed between the reference coil Lref and the side portion 50 to block external influences. For example, the shielding member 600 may be mounted on a substrate 200a to cover the reference coil Lref. In this disclosure, since the reference sensing portion SPref has the same structure and characteristics, a repeated description hereinafter may be omitted.

For example, the first force sensing portion FSP1 may further include a first support member 300-10. The first sensing coil LF1 may be spaced apart from a first force member FM1, which is a part of the frame 51, by a predetermined distance, and may be mounted on the substrate 200a to face the inner side surface of the first force member FM1.

The first support member 300-10 may include a first body member 300-1 and first column members 300-11 and 300-12. The first body member 300-1 may be supported by an internal structure 51S of the frame 51, and may support a portion of the substrate 200a on which the first sensing coil LF1 is mounted. The first column members 300-11 and 300-12 may be supported by the first body member 300-1, and may be attached to both ends of the first force member FM1. In a state in which a touch is not applied from the first force sensing portion FSP1 by the first support member 300-10 and the internal structure 51S described above, the predetermined distance (e.g., D1) by which the first sensing coil LF1 is disposed to be spaced apart from the inner side surface of the frame 51 may be maintained. The foregoing description may be applied to each force sensing portion disclosed herein.

FIG. 6 is a diagram of an internal structure of an electronic device 10-3, according to an embodiment.

Referring to FIG. 6, a touch sensing device 100-3 may include the first force sensing portion FSP1, the reference sensing portion SPref, a second force sensing portion FSP2, and a circuit portion 800-3. The first force sensing portion FSP1 and the reference sensing portion SPref are described above with reference to FIG. 5. The second force sensing unit FSP2 may include a second sensing coil LF2, which is mounted on a substrate 200b along with the reference coil Lref and the first sensing coil LF1, and is disposed to be spaced apart from the inner side surface of the frame 51 by a predetermined distance (e.g., D2. When a touch (e.g., pressing) is applied through a second force member FM2, which is a part of the frame 51, inductance varied according to a change in the distance between the second sensing coil LF2 and the frame 51 according to the touch (e.g., pressing) may be provided.

For example, the second force sensing portion FSP2 may further include a second support member 300-20. The second sensing coil LF2 may be disposed to be spaced apart from an inner side surface of the second force member FM2, which is a part of the frame 51, by a predetermined distance. The second support member 300-20 may include a second body member 300-2 and second column members 300-21 and 300-22. For example, the second body member 300-2 may be supported by the internal structure 51S of the frame 51, and may support a portion of the substrate 200b on which the second sensing coil LF2 is mounted. The second column members 300-21 and 300-22 may be supported by the second body member 300-2, and may be attached to both ends of the second force member FM2.

For example, the reference coil Lref may be manufactured to have the same characteristics as the first sensing coil LF1 and the second sensing coil LF2. Accordingly, due to external factors, each of the reference coil Lref, the first sensing coil LF1, and the second sensing coil LF2 may include noise having the same characteristic, and such noise may be cancelled through a simple subtraction operation, or the like, in the circuit portion 800-3. In this disclosure, the shielding member 600 may be any one of a shield-can, a magnetic sheet, and an electromagnetic wave absorber. This shielding member 600 will be described in more detail with reference to FIGS. 15A and 15B.

Figure 7:
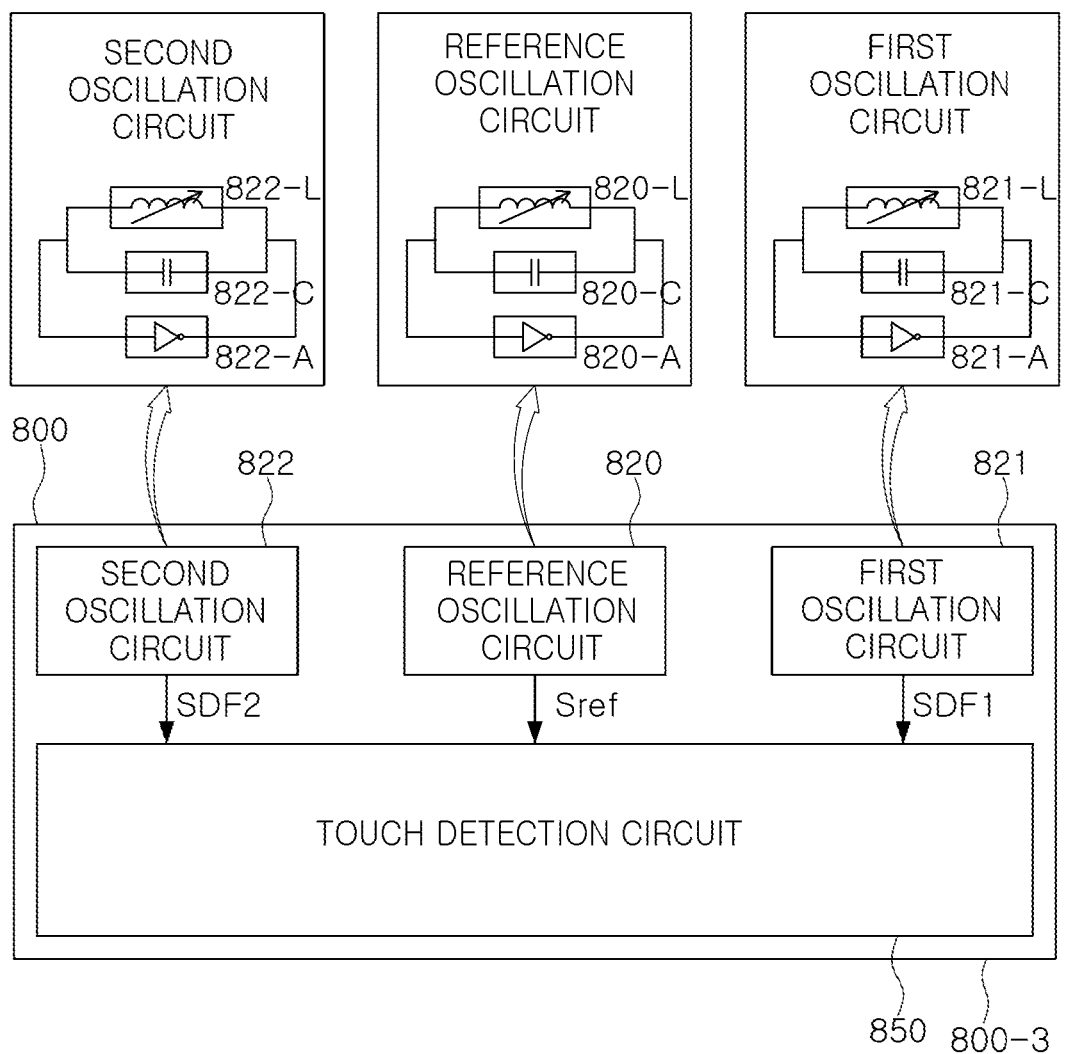
FIG. 7 is a diagram of a circuit portion of FIG. 6, according to an embodiment.

FIG. 7 is a diagram of the circuit portion 800-3 of FIG. 6.

Referring to FIGS. 6 and 7, the circuit portion 800-3 that may be mounted on the substrate 200b. The circuit portion 800-3 may generate first and second force detection signals SDF1 and SDF2 based on inductance varied by each of the first and second force sensing portions FSP1 and FSP2, generate a reference signal Sref based on a reference inductance by the reference sensing portion Sref, and may detect whether a touch has occurred on each of the first and second force members FM1 and FM2 based on the first and second force detection signals SDF1 and SDF2.

For example, the circuit portion 800-3 may include a first oscillation circuit 821, a reference oscillation circuit 820, a second oscillation circuit 822, and the touch detection circuit 850. The first oscillation circuit 821 may include a first capacitance portion 821-C, a first inductance portion 821-L, and a first amplification portion 821-A. The first capacitance portion 821-C may include capacitance due to a first capacitor (which may be disposed inside or outside of the circuit portion 800-3). The first inductance portion 821-L may include inductance by the first sensing inductor LT1 and inductance varied according to a change in the distance between the first sensing coil LF1 and the frame 51 according to the touch. The first amplification portion 821-A may amplify and maintain a signal having a resonance frequency by the first capacitance portion 821-C and the first inductance portion 821-L to output a first touch detection signal SDF1, which is an oscillation signal, having the resonance frequency.

The second oscillation circuit 822 may include a second capacitance portion 822-C, a second inductance portion 822-L, and a second amplification portion 822-A. The second capacitance portion 822-C may include capacitance due to a second capacitor (which may be disposed inside or outside the circuit portion 800-3). The second inductance portion 822-L may include inductance by the second sensing inductor LT2 and inductance varied according to a change in the distance between the second sensing coil LF2 and the frame according to the touch. The second amplification portion 822-A may amplify and maintain a signal having a resonance frequency by the second capacitance portion 822-C and the second inductance portion 822-L to output a second touch detection signal SDF2, which is an oscillation signal, having the resonance frequency.

The reference oscillation circuit 820 may include a reference capacitance portion 820-C, a reference inductance portion 820-L, and a reference amplification portion 820-A, and the reference signal Sref, which is an oscillation signal having the reference resonance frequency, may be output through the same process described with reference to FIG. 4. The touch detection circuit 850 may cancel the noise by using the reference signal Sref, the first touch detection signal SDF1 and the second touch detection signal SDF2, to detect whether the touch (e.g., pressing) has occurred through more accurate respective force members.

Figure 8:
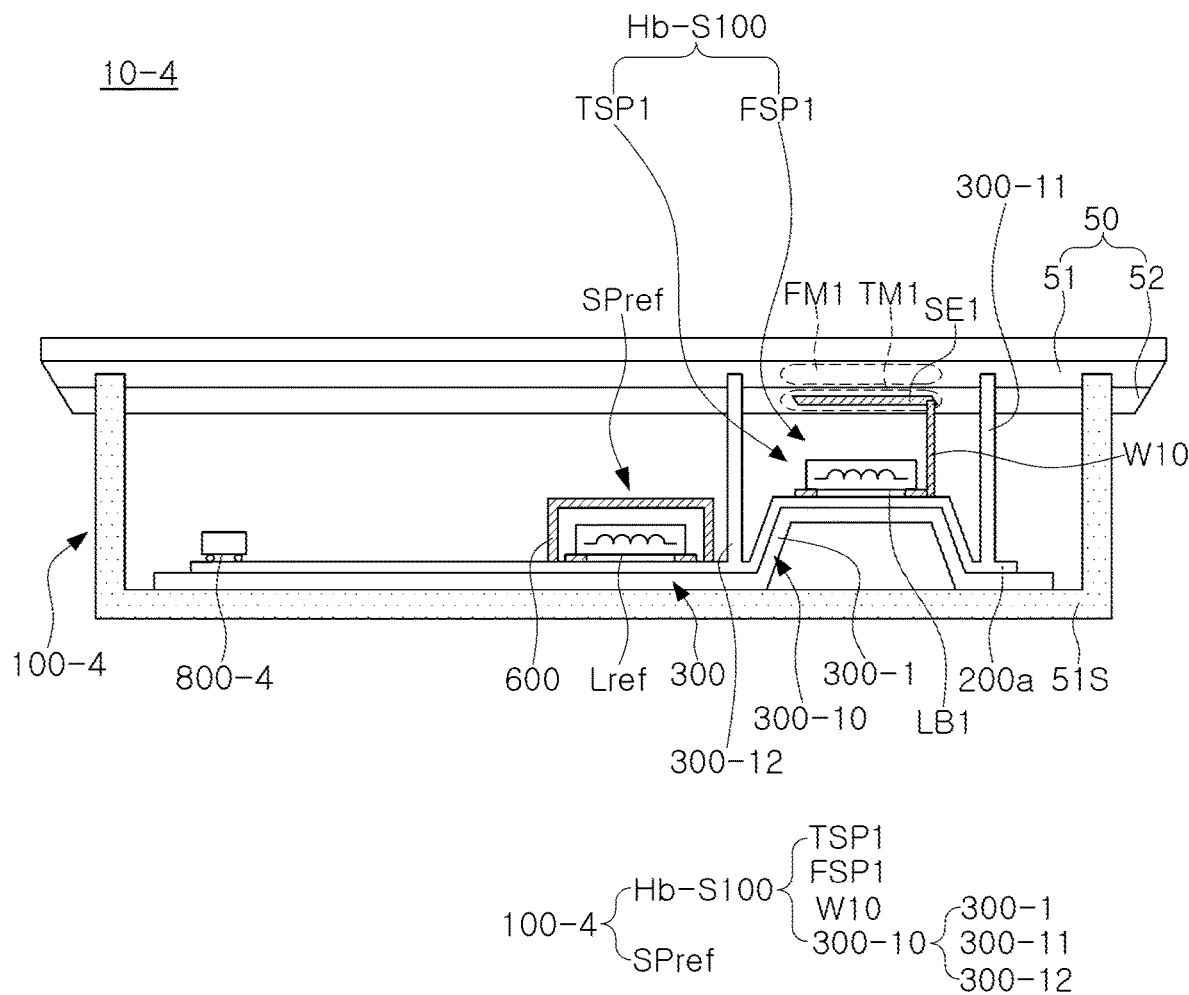
FIG. 8 is a diagram illustrating an internal structure of an electronic device, according to an embodiment.

FIG. 8 is a diagram of an internal structure of an electronic device 10-4, according to an embodiment.

Referring to FIG. 8, the electronic device 10-4 may include, for example, the side portion 50, the touch switch portion TSW, a touch sensing device 100-4, and a circuit portion 800-4.

The side portion 50 may include a cover 52, which is nonconductive, and a frame, which is conductive. The touch switch portion TSW includes a first touch member TM1, which is a part of the cover 52, and a first force member FM1, which is a part of the frame 51. The touch sensing device 100-4 may include a first hybrid sensing portion Hb-S100 and a reference sensing portion SPref. The first hybrid sensing portion Hb-S100 may include the first sensing electrode SE1 and a first sensing inductor LB1 disposed inside the cover 52 and electrically connected to each other, and the first sensing inductor LB1 may be disposed to be spaced apart from the inner side surface of the frame 51 by a predetermined distance. When a touch (e.g., contact+pressing) is applied through the first touch member TM1 and the first force member FM1, the first hybrid sensing portion Hb-S100 may provide capacitance varied according to parasitic capacitance generated between the first sensing electrode SE1 and the human body, and may provide inductance varied according to a change in the distance between the first sensing inductor LB1 and the frame 51. The reference sensing portion SPref may include the reference coil Lref disposed inside the side portion 50, and may provide a reference inductance of the reference coil Lref, which is constant regardless of the application of a touch through the frame 51.

Figure 9:
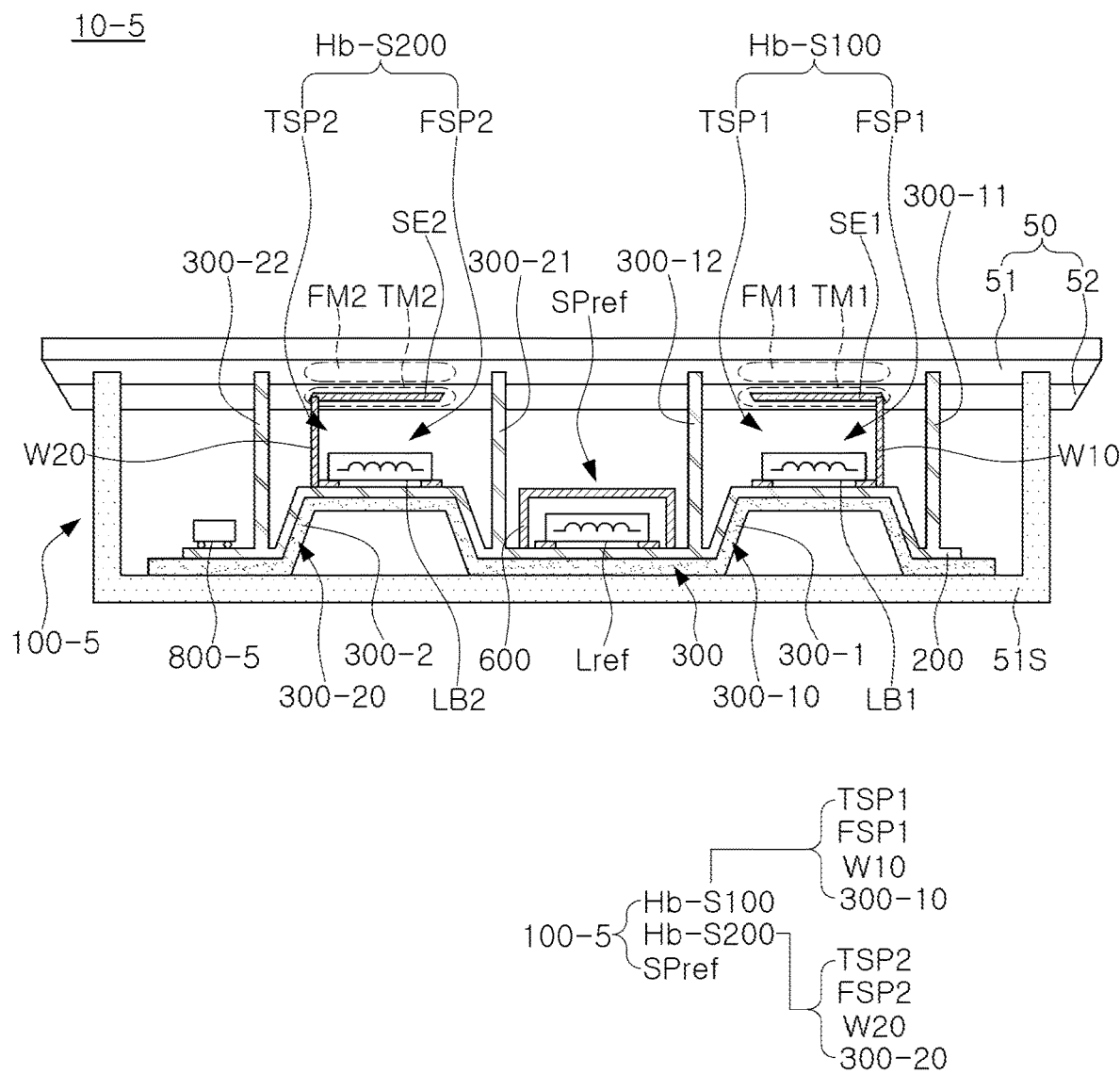
FIG. 9 is a diagram illustrating an internal structure of an electronic device, according to an embodiment.

FIG. 9 is a diagram of an internal structure of an electronic device 10-5, according to an embodiment.

Referring to FIG. 9, a touch sensing device 100-5 applied to an electronic device 100-5 according to an embodiment of the present disclosure may include the first hybrid sensing portion Hb-S100, the reference sensing portion SPref, a second hybrid sensing portion Hb-S200, and a circuit portion 800-5.

The first hybrid sensing portion Hb-S100 and the reference sensing portion SPref are described above with reference to FIG. 8. The second hybrid sensing portion Hb-S200 may include the second sensing electrode SE2 and a second sensing inductor LB2 disposed inside the cover 52 and electrically connected to each other. The second sensing inductor LB2 may be disposed to be spaced apart from the inner side surface of the frame 51 by a predetermined distance.

When a touch (e.g., contact+pressing) of a human body is applied through the second touch member TM2 and the second force member FM2, the second hybrid sensing portion Hb-S200 may provide capacitance varied according to parasitic capacitance generated between the second sensing electrode SE2 and the human body, and may provide inductance varied according to a change in the distance between the second sensing inductor LB2 and the frame 51.

Referring to FIGS. 8 and 9, the first hybrid sensing portion Hb-S100 may include the first sensing electrode SE1, the first sensing inductor, LB1, the first connection lead W10, and the first support member 300-10. The first sensing electrode SE1 may be disposed inside a first touch member TM1, which is a part of the cover 52. The first sensing inductor LB1 may be electrically connected to the first sensing electrode SE1, and may be spaced apart from an inner side surface of the first force member FM1, which is a part the frame 51, by a predetermined distance. The first sensing inductor LB1 may be mounted on the substrate 200*b* to face the inner side surface of the force member FM1.

The first connection conductor W10 may electrically connect the first sensing electrode SE1 to one end of the first sensing inductor LB1. The first support member 300-10 may include the first body member 300-1 and the first column members 300-11 and 300-12. The first body member 300-1 may be supported by the internal structure 51S of the frame 51 and may support the portion of the substrate 200*b* on which the first sensing inductor LB1 is mounted. The first column members 300-11 and 300-12 may be supported by the first body member 300-1 and may be attached to both ends of the first force member FM1.

Referring to FIG. 9, the second hybrid sensing portion Hb-S200 may include the second sensing electrode SE2, the second sensing inductor LB2, the second connection lead W20, and the second support member 300-20.

The second sensing electrode SE2 may be disposed inside the second touch member TM2, which is a part of the cover 52. The second sensing inductor LB2 may be electrically connected to the second sensing electrode SE2, and may be spaced apart from an inner side surface of a second force member FM2, which is a part of the frame 51. The second sensing coil may be mounted on the substrate 200*b* to face the inner side surface of the second force member FM2.

The second connection lead W20 may electrically connect the second sensing electrode SE2 and one end of the second sensing inductor LB2. The second support member 300-20 may include the second body member 300-2 and the second column members 300-21 and 300-22. The second body member 300-2 may be supported by the internal structure 51S of the frame 51 and may support the portion of the substrate 200*b* on which the second sensing coil LF2 is mounted. The second column members 300-21 and 300-22 are supported by the second body member 300-2 and may be attached to both ends of the second force member FM2. For example, the reference coil Lref may be manufactured to have the same characteristics as the first sensing inductor LB1 and the second sensing inductor LB2. Accordingly, due to external factors, each of the reference coil Lref, the first sensing inductor LB1 and the second sensing inductor LB2 may include noise having the same characteristic, and such noise may be cancelled through a simple subtraction operation or the like in the circuit portion 800-5.

Figure 10:
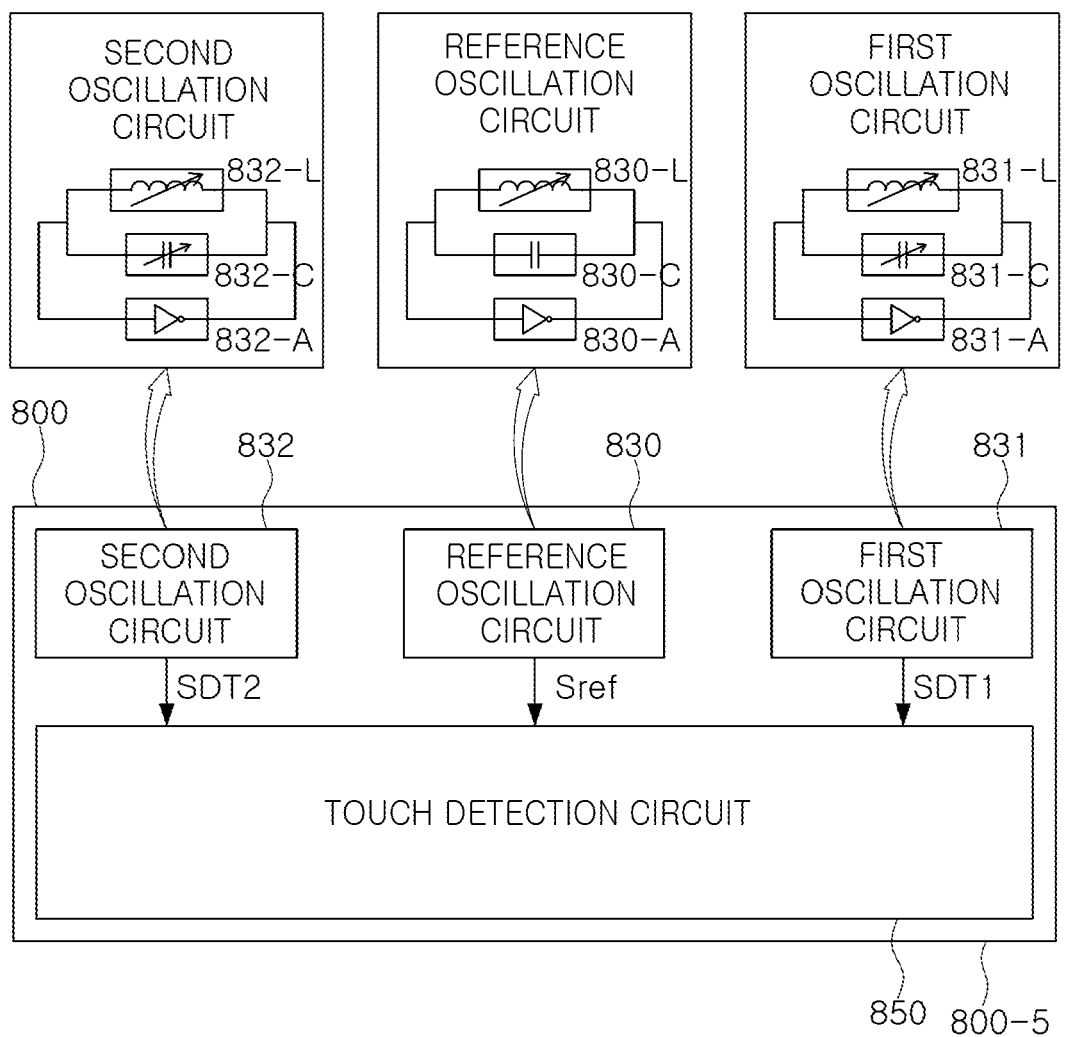
FIG. 10 a diagram of a circuit portion of FIG. 9, according to an embodiment.

FIG. 10 is a diagram of the circuit portion 800-5 of FIG. 9.

Referring to FIGS. 9 and 10, the circuit portion 800-5 may be mounted on the substrate 200*b*.

The circuit portion 800-5 may generate the first and second touch detection signals SDT1 and SDT2 based on capacitance varied by each of the first and second touch sensing portions TSP1 and TSP2 and inductance varied by each of the first and second force sensing portions FSP1 and FSP2, generate the reference signal Sref based on a reference inductance by the reference sensing portion Sref, and detect whether a touch has occurred based on the reference signal Sref, and the first and second touch detection signals SDT1 and SDT2. For example, the circuit portion 800-5 may include a first oscillation signal 831, a reference oscillation signal 830, a third oscillation signal 832, and a touch detection circuit 830.

The first oscillation circuit 831 may include a first capacitance portion 831-C, a first inductance portion 831-L, and a first amplification portion 831-A. The first capacitance portion 831-C may include capacitance due to a first capacitor (may be disposed inside or outside of the circuit portion 800-5) and parasitic capacitance generated by a touch. The first inductance portion 831-L may include inductance by the first sensing inductor LB1 and inductance varied according to a change in the distance between the first sensing coil LF1 and the frame 51 according to the touch. The first amplification portion 831-A may amplify and maintain a signal having a resonance frequency by the first capacitance portion 831-C and the first inductance portion 831-L to output a first touch detection signal SDT1, which is an oscillation signal having the resonance frequency.

The second oscillation circuit 832 may include a second capacitance portion 832-C, a second inductance portion 832-L, and a second amplification portion 832-A. The second capacitance portion 832-C may include capacitance due to a second capacitor (may be disposed inside or outside the circuit portion 800-5) and parasitic capacitance generated by a touch. The second inductance portion 832-L may include inductance by the second sensing inductor LB2 and inductance varied according to a change in the distance between the second sensing coil LF2 and the frame 51 according to the touch. The second amplification unit 832-A may amplify and maintain a signal having a resonance frequency by the second capacitance portion 832-C and the second inductance portion 831-L to output a second touch detection signal SDT2, which is an oscillation signal having the resonance frequency.

The reference oscillation circuit 830 may include a reference capacitance portion 830-C, a reference inductance portion 830-L, and a reference amplification portion 830-A, and may output a reference signal Sref, which is an oscillation signal having the reference resonance frequency, through the same process described with reference to FIG. 4.

The touch detection circuit 850 may cancel the noise by using the reference signal Sref, the first touch detection signal SDT1, and the second touch detection signal SDT2, to detect whether a touch (e.g., contact+pressing) has occurred through more accurate respective force members.

Figure 11:
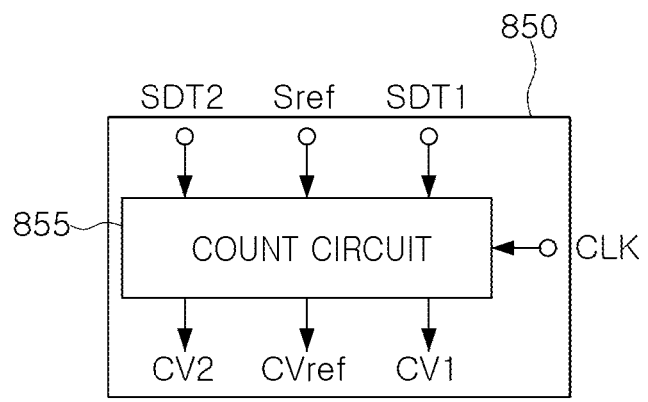
FIG. 11 is a diagram of a touch detection circuit, according to an embodiment.

FIG. 11 is a diagram of the touch detection circuit 850, according to an embodiment.

Referring to FIG. 11, the touch detection circuit 850 may include a count circuit 855. The count circuit 855 may count each of the first touch detection signal SDT1, the reference signal Sref, and the second touch detection signal SDT2, to generate a first count value CV1, a second count value CV2, and a reference count value CVref.

Figure 12:
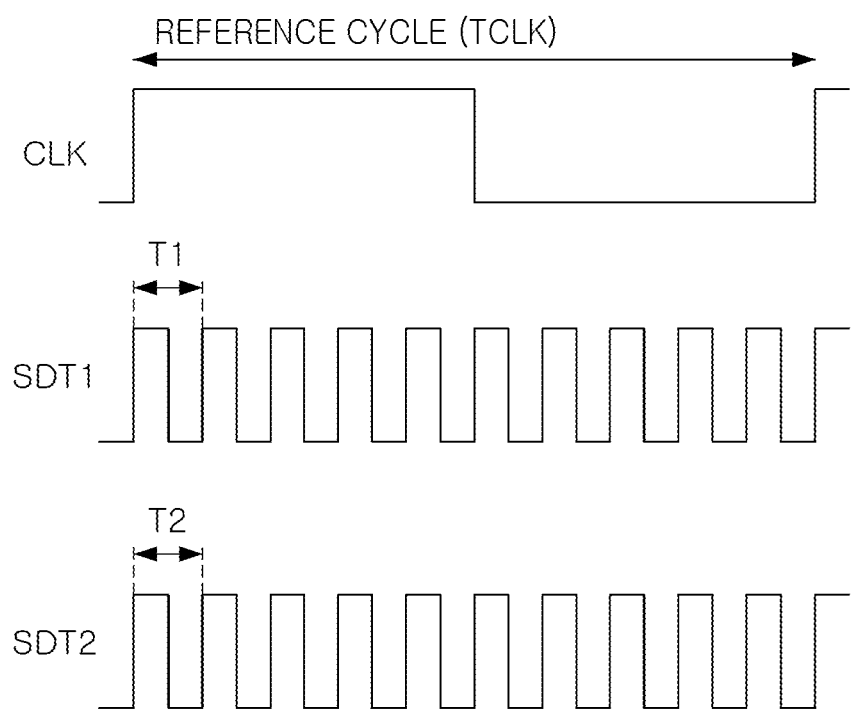
FIG. 12 is a diagram illustrating an operation of a count circuit of FIG. 11, according to an embodiment.

FIG. 12 is a diagram illustrating an operation of the count circuit 855 of FIG. 11, according to an embodiment.

Referring to FIG. 12, a cycle TCLK of a reference clock CLK may be longer than a cycle T1 of the first touch detection signal SDT1. Accordingly, the number of times that one cycle T1 of the first touch detection signal SDT1 is included during one cycle TCLK of the reference clock CLK may be counted.

For example, when the reference clock CLK is 1 MHz, the cycle TCLK may be 1 µs, and when the first touch detection signal SDT1 is 10 MHz, the cycle T1 may be 0.1 µs. In this case, the period TCLK of the reference clock CLK may include 10 periods T1 of the first touch detection signal SDT1, and accordingly, when one cycle of the reference clock CLK is counted using the first touch detection signal SDT1, a first count value CV1 may be 10. This relationship may be expressed by Equation 1 below.

$$CV1=[TCLK]/[Tosc]=10 \qquad \text{[Equation 1]}$$

In addition, the reference clock CLK may be, for example, 32 kHz, and may be a frequency of 1/m times of 32 kHz, where m may be an integer.

In the same manner as described above, when one cycle of the reference clock CLK is counted using a second touch detection signal SDT2, a second count value CV2 may be 10, and a reference count value CVref can also be obtained.

In the example of FIG. 12, each of the first count value CV1 and the second count value CV2 is 10. However, in other examples, the first count value CV1 and the second count value CV2 may be different from each other.

For example, if first and second ratio values SEN1 and SEN2 are obtained for each of the first count value CV1 and the second count value CV2 based on a reference count value CVref, the first and second ratio values SEN1 and SEN2 may be expressed as in a following Equation 2.

$$SEN1=[CV1]/[CVref], SEN2=[CV2]/[CVref] \qquad \text{[Equation 2]}$$

For example, when a touch operation occurs, and the first count value CV1 changes by 10% (1.1%) (when there is a 10% change in the first count value CV1), it may be expressed as Equation 3 below.

$$[CV1*1.1]/[CVref]=SEN1*1.1 \qquad \text{[Equation 3]}$$

Referring to Equation 3, when there is a 10% change (1.1) in the first count value CV1, it can be seen that a 10% change also occurs in the first ratio value SEN1 When there is a 10% change (1.1) in each of the first count value CV1 and the reference count value CVref caused by an external factor, it can be expressed as Equation 4 below.

$$[CV1*1.1]/[CVref*1.1]=SEN1*(1.1/1.1) \qquad \text{[Equation 4]}$$

Referring to Equation 4, when both the first count value CV1 and the reference count value CVref have a 10% change (1.1), it can be seen that the first ratio value SEN1 does not change, Accordingly, it can be seen that noise components caused by external factors may be cancelled.

The contents described with reference to FIGS. 11 and 12 may be applied to each embodiment disclosed herein, and the nose caused by an external factor may be canceled through the same operational principle.

Figure 13:
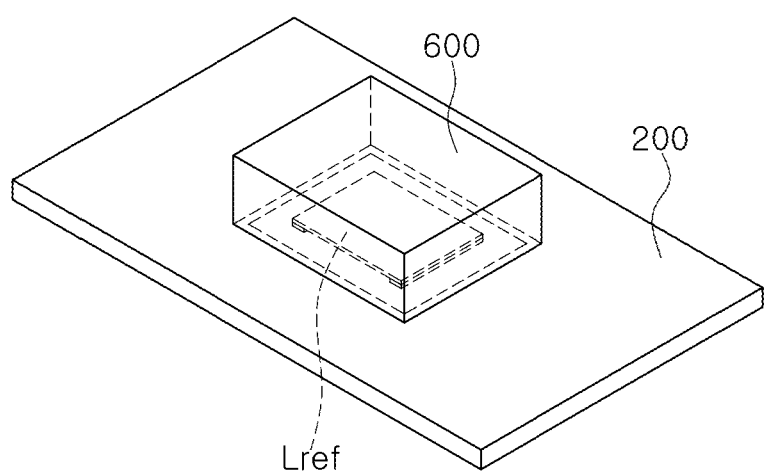
FIG. 13 is a diagram illustrating coupling of a shielding member and a substrate, according to an embodiment.
Figure 14A:
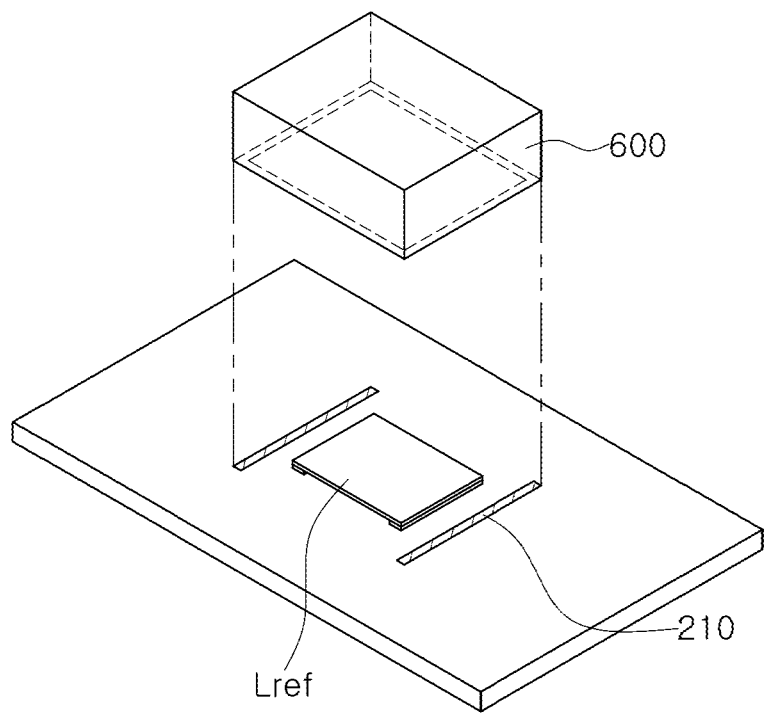
FIGS. 14A and 14B are views of separation and coupling of a shielding member and a substrate, according to an embodiment.
Figure 14B:
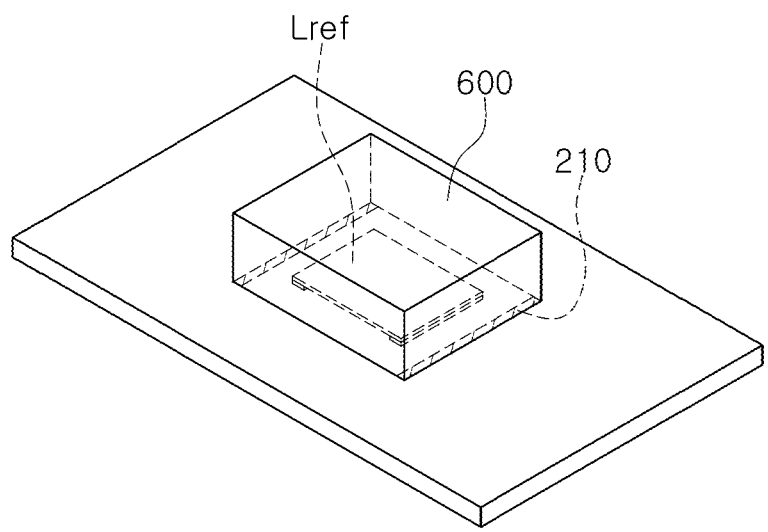
Figure 15A:
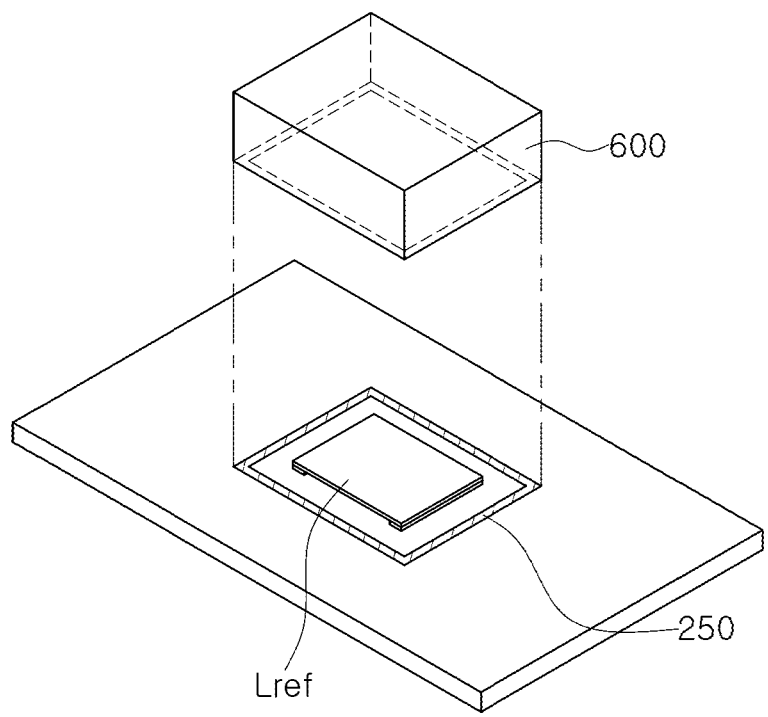
FIGS. 15A and 15B views of separation and coupling of a shielding member and a substrate, according to an embodiment.
Figure 15B:
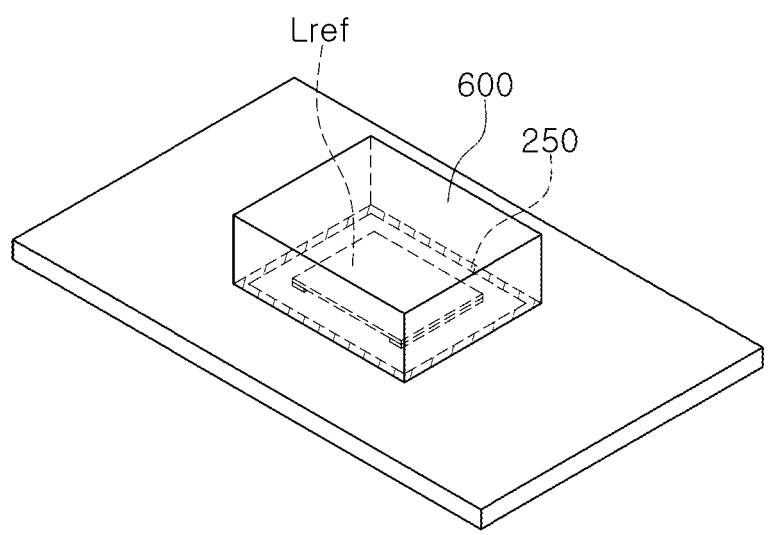

FIG. 13 is a diagram of coupling of the shielding member 600 and the substrate 200, according to an embodiment. FIGS. 14A and 14B are diagrams of separation and coupling of the shielding member 600 and the substrate 200, according to an embodiment. FIGS. 15A and 15B are diagrams of separation and coupling of the shielding member 600 and the substrate 200, according to an embodiment.

Referring to FIG. 13, in order to impart a shielding performance, the shielding member 600 may be mounted on the substrate 200 to surround the reference coil Lref.

Referring to FIGS. 14A and 14B, in order to improve a shielding performance, the shielding member 600 may be connected to a plurality of partial ground lines 210 separated from each other on the substrate 200 so as to surround the reference coil Lref, and mounted on the substrate 200. The ground lines 210 may be ground patterns partially formed on the substrate 200.

Referring to FIGS. 15A and 15B, in order to further improve a shielding performance, the shielding member 600 may be connected to an entire closed ground line 250 formed on the substrate 200 to surround the reference coil Lref, and may be mounted on the substrate 200. The ground line 250 may be a ground pattern formed in a closed shape (e.g., a rectangle or a circle) on the substrate 200.

Referring to FIGS. 13 to 15B, the shielding member 600 may be attached to the substrate 200 through a coupling method such as soldering, but is not limited to such a coupling method. In addition, the shielding member 600 may be one of a shield-can, a magnetic sheet, and an electromagnetic wave absorber, but is not limited thereto, and may be constructed of a material having a shielding property.

As set forth above, according embodiments disclosed herein, a malfunction due to external factors may be prevented by cancelling external power, a temperature, or external noise affecting a frequency due to a LC resonance by using a reference coil.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A touch sensing device applied to an electronic device including a side portion having a cover that is nonconductive, and a frame that is conductive, the touch sensing device comprising:

a first touch sensing portion comprising a first sensing electrode and a first sensing inductor disposed inside the cover and electrically connected to each other, wherein, in response to a touch applied through the cover by a human body, a capacitance is varied by the first touch sensing portion according to parasitic capacitance generated between the first sensing electrode and the human body according to the touch applied through the cover; and a reference sensing portion comprising a reference coil disposed inside the side portion and configured to provide reference inductance of the reference coil that is constant, regardless of a touch applied through the frame.

2. The touch sensing device of claim 1, wherein the reference sensing portion further comprises a shielding member disposed between the reference coil and the side portion, and configured to block external influences.

3. The touch sensing device of claim 2, wherein the shielding member is any one of a shield-can, a magnetic sheet, and an electromagnetic wave absorber.

4. The touch sensing device of claim 1, wherein the first sensing electrode is disposed inside a first touch member, and the first touch member is a part of the cover,
wherein the first sensing inductor is electrically connected to the first sensing electrode and is mounted on a substrate, and
wherein the first touch sensing portion further comprises a first connection lead electrically connecting the first sensing electrode to one end of the first sensing inductor.

5. The touch sensing device of claim 1, further comprising:
a second touch sensing portion comprising a second sensing electrode and a second sensing inductor disposed inside the cover, and electrically connected to each other,
wherein, in response to another touch applied through the cover by the human body, capacitance is varied by the second touch sensing portion according to parasitic capacitance generated between the second sensing electrode and the human body according to the other touch applied through the cover.

6. The touch sensing device of claim 5, wherein the second sensing electrode is disposed inside a second touch member that is a part of the cover,
wherein the second sensing inductor is electrically connected to the second sensing electrode and is mounted on a substrate, and
wherein the second touch sensing portion further comprises a second connection lead electrically connecting the second sensing electrode to one end of the second sensing inductor.

7. The touch sensing device of claim 6, wherein the reference coil, the first sensing inductor, and the second sensing inductor have same characteristics.

8. The touch sensing device of claim 5, further comprising a circuit portion configured to:
generate a first touch detection signal and a second touch detection signal based on the capacitance varied by the first touch sensing portion and the capacitance varied by the second touch sensing portion;
generate a reference signal based on reference inductance; and
detect whether each of the touch and the other touch occurs, based on the reference signal, and the first touch detection signal, and the second touch detection signal.

9. An electronic device, comprising:
a side portion having a cover that is nonconductive and a frame that is conductive;
a touch switch portion comprising a first touch member that is a part of the cover;
a first touch sensing portion comprising a first sensing electrode and a first sensing inductor disposed inside the cover and electrically connected to each other,
wherein, in response to a touch applied through the first touch member by a human body, capacitance is varied by the first touch sensing portion according to parasitic capacitance generated between the first sensing electrode and the human body according to the touch applied through the first touch member; and
a reference sensing portion comprising a reference coil disposed inside the side portion and configured to provide reference inductance of the reference coil that is constant, regardless of a touch applied through the frame.

10. The electronic device of claim 9, wherein the reference sensing portion further comprises a shielding member disposed between the reference coil and the side portion, and configured to block external influences.

11. The electronic device of claim 10, wherein the first sensing electrode is disposed inside the first touch member;
wherein the first sensing inductor is electrically connected to the first sensing electrode, and mounted on a substrate; and
wherein the first sensing portion further comprises a first connection lead electrically connecting the first sensing electrode to one end of the first sensing inductor.

12. The electronic device of claim 10, further comprising:
a second touch sensing portion comprising a second sensing electrode and a second sensing inductor disposed inside the cover and electrically connected to each other,
wherein, in response to a touch applied through the cover by the human body, capacitance is varied by the second touch sensing portion according to parasitic capacitance generated between the second sensing electrode and the human body according to the touch applied through the cover.

13. The electronic device of claim 12, wherein the second sensing electrode is disposed inside a second touch member that is a part of the cover,
wherein the second sensing inductor is electrically connected to the second sensing electrode and mounted on a substrate, and
wherein the second touch sensing portion further comprises a second connection lead electrically connecting the second sensing electrode to one end of the second sensing inductor.

14. The electronic device of claim 13, wherein the reference coil, the first sensing inductor, and the second sensing inductor have same characteristics.

15. The electronic device of claim 14, further comprising a circuit portion configured to:
generate first and second touch detection signals based on the capacitance varied by the first touch sensing portion and the capacitance varied by the second touch sensing portion;
generate a reference signal based on the reference inductance; and
detect whether each of the touch applied through the first touch member and the touch applied through the cover occurs, based on the reference signal, the first sensing signal, and the second sensing signal.

16. The electronic device of claim 10, wherein the shielding member is any one of a shield-can, a magnetic sheet, and an electromagnetic wave absorber.

* * * * *